W. O. SNELLING.
METHOD OF TREATING OLD WELLS.
APPLICATION FILED AUG. 2, 1913.
1,104,011.
Patented July 21, 1914.
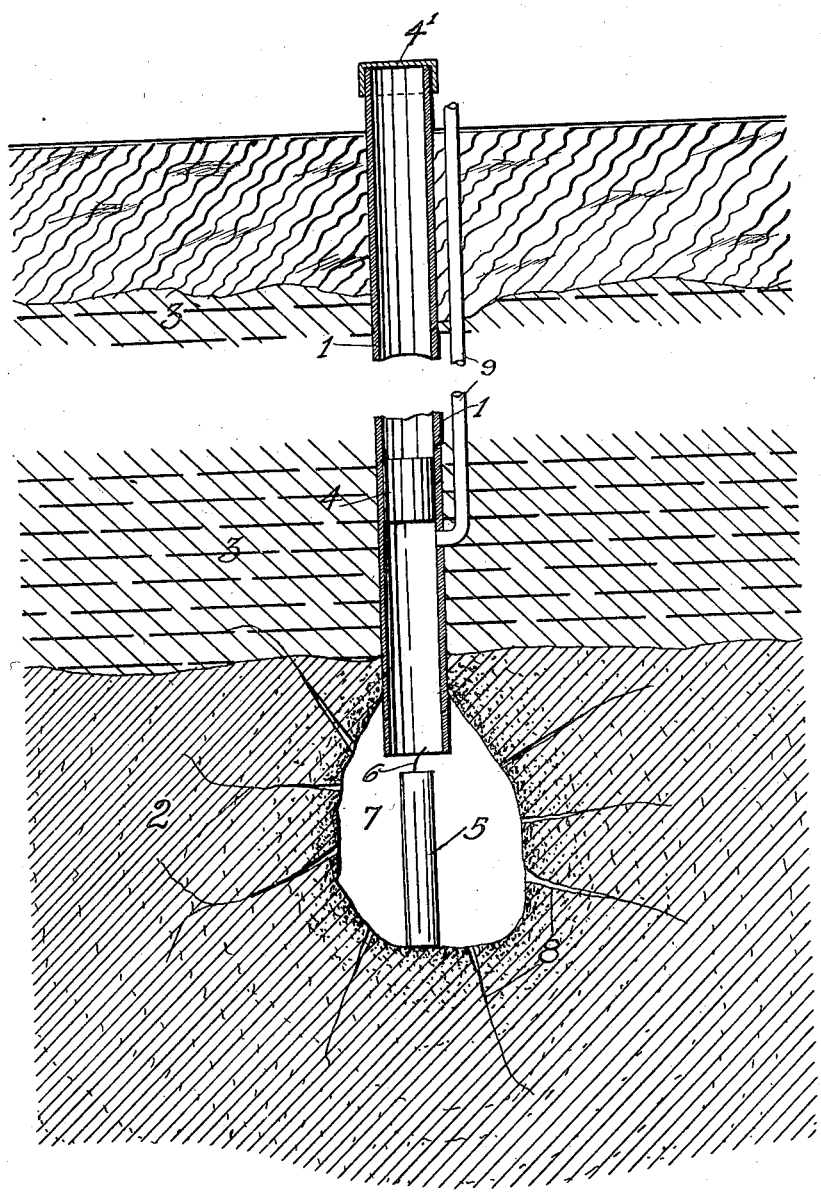
WITNESSES:
INVENTOR.
Walter O. Snelling
BY
HIS ATTORNEY.

UNITED STATES PATENT OFFICE.

WALTER O. SNELLING, OF PITTSBURGH, PENNSYLVANIA.

METHOD OF TREATING OLD WELLS.

1,104,011.  Specification of Letters Patent.  Patented July 21, 1914.

Application filed August 2, 1913. Serial No. 782,695.

*To all whom it may concern:*

Be it known that I, WALTER O. SNELLING, a citizen of the United States, and a resident of Pittsburgh, county of Allegheny, State of Pennsylvania, have invented certain new and useful Improvements in Methods of Treating Old Wells, of which the following is a description.

My invention relates to a method of treating old wells, particularly old oil and gas wells, for the purpose of rejuvenating and increasing the yield of the same.

It is well known that the porous formations in the vicinity of oil and gas wells, constituting the oil or gas-bearing strata, such as sandstone, etc., gradually become clogged by paraffin and tarry matters, because of which the flow and production of a well slowly decreases. Various efforts have been made from time to time to find effective methods for removing such obstructions. The efficiency of heat in this connection has long been recognized, and the introduction within the bore-hole of a well of electric heaters, steam, burning gas, etc., have been described. By such methods it is possible to heat up the lower part of a bore-hole, so as to melt part of the clogging hydrocarbons. I believe, however, that by none of these proposed methods is the heat produced sufficiently intense, nor does it penetrate far enough through the obstructing material to achieve any great measure of success. It may also be noted that the process of firing a large charge of nitroglycerin within an oil well, with detonation, is well known, by which means the rock in the vicinity is fractured and fissured. This is usually done in the case of new wells, to open up fractures through which the oil can find more ready access to the well; the firing of nitroglycerin has however also been employed to restore wells clogged by paraffin or tarry matters, the shattering effect of the explosion producing open channels or fissures through the clogged material, extending sufficiently far into unclogged porous material to enable a flow of oil to again be obtained. When, however, a well is "shot" with nitroglycerin, the impervious clay capping, overlying the porous oil-bearing formation, is often fractured, in which case the oil works through the fractures and is lost forever.

My present invention consists in a new and greatly superior method for removing paraffin, tar and other materials which may have accumulated within the pores of sandstone or other porous material at the lower part of an oil well, through the production in a comparatively slow and regular manner, of highly heated gases under great pressure, by the burning of a suitable pyrotechnic gas-producing mixture. This is carried out most simply by bringing about within the well, a chemical reaction within a suitable reactive mixture, as of a combustible agent and a supporter of combustion, as a result of which there are evolved large volumes of highly heated gas under great pressure, the bore-hole of the well being closed at the time to prevent the escape of the heated gases evolved and to enable the requisite pressure to be reached. By such methods I find I can melt and drive away to a considerable distance the deposited paraffin and tarry bodies, and since the gases are evolved with comparative slowness and without violence, there is no fracturing effect, the gases evolved acting entirely to melt, dissolve and push before them the paraffin bodies, made fluid by the high temperatures produced.

The object of my invention is accordingly to increase the yield of a well by decomposing, melting, volatilizing or otherwise removing from the vicinity of an old well, the clogging bodies described, by burning a non-detonating explosive mixture within a closed well, or by otherwise evolving or introducing within a well, in a comparatively slow and non-violent manner, gases of such high temperature and pressure as to be capable of producing the desired effect.

In order that my invention may be more easily comprehended, attention is hereby directed to the accompanying drawing, forming part of this specification, and illustrating one manner of carrying out my invention.

In the drawing, the figure represents a vertical cross-section, partly broken away, through a well equipped with means for carrying out one form of my process.

As I have stated, I deem it essential to the efficient carrying out of my process that the bore hole should be closed by some form of plug, to prevent the escape of the heated gases, and to enable the requisite pressure to be reached. This may be accomplished in any desired manner, as by capping the well, or by inserting into the tubing of the well an expandible member capable of being forced tightly against the walls of the well, and able to resist a pressure from below, and yet being removed from the well when desired, or by filling a portion of the tubing in the well with a stemming material, such as packed clay, cement, or other suitable substance, which through its inertia, or resistance to sudden motion, enables the requisite pressure to be reached. After removing paraffin and tarry matters, in the manner described, the stemming or tamping material may be removed by drilling through same, or in any other suitable way.

In its simplest form my invention is carried out by placing within the well, and preferably at its bottom, a suitable slow-burning mixture, which may be contained in a suitable tube or vessel, together with a fuse or other suitable means for igniting the same, without detonation.

Referring to the drawing, the wall of the well, partly broken away to indicate great length, is represented by the reference character 1, the bore hole tapping the porous sandstone or other oil bearing stratum 2, which is represented as being covered by an upper shale-like, non-porous layer 3.

At 4 I have represented a plug closing the bore hole to retain the gas produced, this plug being of any suitable character, such as a packing placed in the bore hole after the gas evolving mixture has been lowered therein. Or if desired, a cap 4' may be placed above the well. The gas evolving mixture is represented as contained in the vessel 5 which may be of any suitable character, such as a can provided with a fuse 6, which is lighted before the vessel 5 is lowered into the well.

As nearly all wells are "shot" with nitroglycerin when first brought in, I have shown at the lower part of the well a large irregular chamber 7 representing the hole made by the nitroglycerin, from which hole the cracks and fissures 8, made when the nitroglycerin was fired, are represented as extending.

The combustible mass which I use is a self-contained source of heated gases, consisting of combustible compounds and the oxygen required for the combustion of such compounds, or other endothermic chemical mixture or compound, capable of undergoing change with the evolution of highly heated gases under pressure, and preferably it is a pyrotechnic mass consisting of nitrated organic bodies, so that its products of combustion will not include solid residue. By the term "pyrotechnic mass" I mean a slow burning mixture or compound which contains within itself both a combustible material, and the oxygen required to combine with such combustible material, and according to my process the desired gases of high heat and pressure are produced by chemical reactions brought about in such a pyrotechnic mass. The mixture may comprise an explosive similar to gun powder, thermit mixed with suitable gas-evolving materials, or other chemical mass which, by fuse or other initiating means, will produce a large volume of hot gases, under high pressure, the evolution of gases taking place slowly and regularly. I may use a mixture consisting of metallic nitrates with charcoal and sulfur, and in many cases this will be found to be highly desirable. Usually, however, a still more desirable material for use will be nitrated cotton, nitrated starch, or even nitro-glycerin. It should be particularly noted, however, that such bodies, if used, are to be used as simple combustible mixtures, my invention being concerned with the use of a non-detonating explosive mixture, for the purpose and because of the reasons above noted. Nitro celluloses and other nitrated organic compounds are well known as detonating materials, and their use to rend and fissure the rock in torpedoing oil wells is well known. The use of these explosives when exploded with detonation is outside the scope of my invention, in which, however, such substances may be employed as sources of heated gas under high pressure. Nitro cellulose burns, when simply ignited by flame as contemplated by me, but never detonates, and to bring about its detonation a primer is required, consisting of fulminate of mercury, or other compound detonating by contact with flame, and no detonating means is employed in my invention.

In another form of my invention a considerable mass of heat-evolving mixture, such as thermit, for example, is lowered to the bottom of the well and chemical reaction is started within the same. The well being closed, as stated, I then force steam, air, or suitable gas, under pressure, into the bore hole. This may be accomplished by any suitable means such as by the connection 9, indicated in the drawing connecting the interior of the bore hole below cap 4' or plug 4 with a steam pump or other means for forcing steam or a neutral gas under pressure down the bore hole. The gas so introduced becomes greatly superheated on passing through or into the proximity of the heat-evolving member or mixture, and passing outward through the porous strata has the dissolving and paraffin-removing action already described. It is not absolutely essential, in practising this form of my invention, that the heat-producing mass should be located at the bottom of the well, since it could, with very fair results be located in the upper part of the closed well.

It is obvious that by my invention a regular and controllable effect is produced, and that the amount and nature of the mixture to be burned can be decided upon in accordance with the heat, pressure, etc., called for by the local conditions.

While I have described my invention particularly with reference to oil wells, it is obvious that it is also applicable to the treatment of gas wells, and to other wells in which the same or similar difficulties arise, due to the clogging or obstruction of formations or passages within the earth, or to situations generally in which it is desirable to dissolve or remove substances near the bottom of the well by heat and pressure, without rending or fracturing the surrounding formations.

In practising the invention, the well will be kept closed until a sufficient time has elapsed for the heated gases to penetrate the clogged formations, or until the pressure in the well has greatly decreased, showing that the gases have largely escaped through the rock, and exercised its obstruction removing functions in so doing. It is also obvious that it is not necessary for the closure of the well to be at the top, although in most cases it will be convenient to close the well at the top. The well may be closed at any distance below the surface, and above the gas-evolving mixture, or section to be heated.

Having now described my invention what I claim and desire to protect by Letters Patent is:—

1. The method of treating old wells, which consists in closing the well and producing therein, in a slow and regular manner, a large volume of highly heated gas under considerable pressure, in such a manner that the gas so produced will, in passing outward from the well, tend to melt, dissolve, thermolize, decompose or otherwise remove paraffin and other bodies obstructing the pores or passages of the formation adjacent to the well.

2. The method of treating old wells, which consists in closing the well and burning therein without detonation a pyrotechnic mass or mixture to produce a considerable volume of highly heated gas under pressure, and keeping the well closed for a sufficient time to enable the gas so produced to largely pass out through the pores or passages of the surrounding formation, and exercise a volatilizing melting or removing action on paraffin or other obstructions in such pores or passages.

3. The method of treating old wells, which consists in closing the well, producing therein a considerable volume of highly heated gas under pressure, the production of such gas within the well and the temperature of the same, being so regulated that the pressure thereof is increased gradually and without violent acceleration, until the maximum is reached, and keeping the well closed for a sufficient time to enable the hot gas to penetrate the walls of the closed space and melt, dissolve or push aside bodies in its path.

4. The method of treating old wells, which consists in causing the production of a large body of highly heated gas under pressure, within a closed well, by chemical reaction, without detonation, within a pyrotechnic mass comprising combustible compounds and the oxygen required for their combustion, such gas exercising a melting or removing action on paraffin or other obstructions in the porous formations adjacent to the well.

5. The method of treating old wells, which consists in causing the production of a large body of highly heated gas under pressure, within the well, by the combustion of a considerable quantity of a non-detonating explosive mixture comprising nitrated organic bodies, which gas is capable of penetrating the porous formations adjoining the well and melting or removing paraffin and other obstructions therein.

6. The method of treating old wells, which consists in causing a chemical reaction in a considerable mass of a heat-evolving mixture, within a well, closing the well and introducing within the closed well and into the proximity of such mixture a suitable gas under pressure, capable when highly heated of penetrating the adjoining porous formations and melting or removing paraffin therein.

7. The method of treating old wells, which consists in bringing about within such a well, while closed to the atmosphere, a chemical reaction within a non-detonating endothermic chemical compound or mixture, capable of evolving highly heated gases under pressure.

This specification signed and witnessed this 31st day of July 1913.

WALTER O. SNELLING.

Witnesses:
A. J. PHILLIPS,
MAY WILLIAMS.